UNITED STATES PATENT OFFICE.

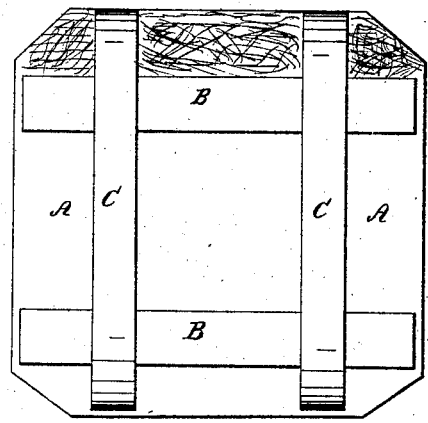
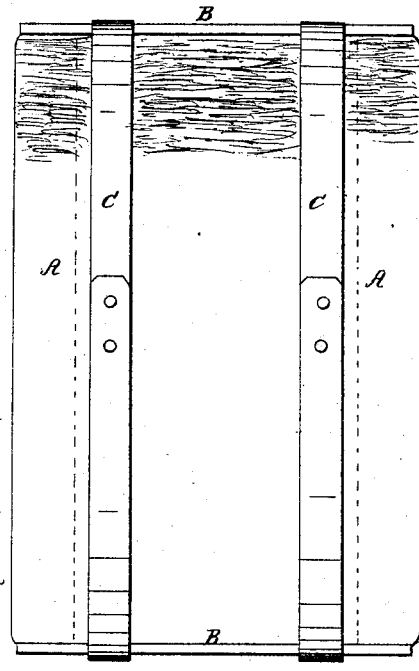

ROSWELL WAKEMAN AND JOSEPH L. BALLANCE, OF PORT DEPOSIT, MD.

IMPROVEMENT IN BALING HAY.

Specification forming part of Letters Patent No. 56,294, dated July 10, 1866.

*To all whom it may concern:*

Be it known that we, ROSWELL WAKEMAN and JOSEPH L. BALLANCE, of Port Deposit, in the county of Cecil, State of Maryland, have invented a certain new and useful article of manufacture, trade, and commerce—that is, the putting up short-cut hay or straw for feed into solid substantial bales; and the following is a clear, full, and exact description of the same, reference being had to the accompanying drawings, making a part of this specification, in which—

Figure 1 shows an end view of a bale of short-cut hay for feed. Fig. 2 is a side view of the same.

The object of our invention is to furnish those who reside in towns and cities and desire to keep one or more horses or cows with a manufactured article for feed ready for use—an article that is so compact that it will retain all of its qualities, is easily handled, and can be shipped or otherwise transported without losing or wasting any of it.

Our invention consists simply in putting up short-cut hay or straw into solid convenient-sized bales for transportation and handling, ready for use on delivery.

To enable others skilled in the art to make and use our new article of manufacture, trade, and commerce, we will describe it more fully, referring to the drawings, and the letters marked thereon.

A A represent the compacted body of short-cut hay or straw, cut as short as is ever desirable for chop-feed, on each end of which are placed two narrow strips of light board, B B. Over the strips, crosswise and surrounding the mass of cut hay, are placed two narrow iron bands, C C, whose ends are brought together and riveted firmly while the hay is under its hardest pressure, the form of the matrix in which the bales are put up being such as to leave no sharp or right-angled corners for the hay to be loosened, so as to waste in handling. Bales weighing from five hundred to one thousand pounds may be put up in a perfect octagonal form, and every straw firmly secured by cross-banding.

We have demonstrated the fact that a much larger quantity of hay can be secured in a bale of the same dimensions when cut short for feed by the same amount of power applied for pressing than can be when the straws are their full length as mowed and made into hay. Thereby the bulk is greatly diminished, and the properties better retained for convenient purposes.

Thus it will be seen that putting short-cut hay into compact bales is in every sense a manufactured article, changing the raw material into an article of trade, ready for use in the most convenient way without any further manipulation by the purchaser or consumer, and as a convenience to small stock-keepers, who buy their feed, there can be found no parallel, and for livery-stable keepers and street-car companies the conveniences and advantage will be very great, and it has been asserted by army officers that it is their belief that during the late rebellion, if the hay had been furnished cut in bales for rations it would have saved the government at least a million of dollars.

Having thus described our invention, what we claim as new, and desire to secure by Letters Patent, is—

Putting up short-cut hay or straw into compact bales for feed, substantially in the manner herein described, for the purposes set forth.

Subscribed to on this 15th day of March, 1866.

ROSWELL WAKEMAN.
JOSEPH L. BALLANCE.

Witnesses:
JNO. C. MAXWELL,
A. SNOW.